United States Patent [19]

Stöppelkamp

[11] Patent Number: 5,388,036
[45] Date of Patent: Feb. 7, 1995

[54] ADJUSTMENT SYSTEM FOR A MOTOR VEHICLE HEADLIGHT REFLECTOR

[75] Inventor: Rolf Stöppelkamp, Lippstadt, Germany

[73] Assignee: Hella KG Hueck & Co., Lippstadt, Germany

[21] Appl. No.: 214,107

[22] Filed: Mar. 17, 1994

[30] Foreign Application Priority Data

Mar. 27, 1993 [DE] Germany .............................. 4310069

[51] Int. Cl.⁶ .................................................. B60Q 1/06
[52] U.S. Cl. ........................................ 362/66; 362/421
[58] Field of Search ................................. 362/66, 421

[56] References Cited

U.S. PATENT DOCUMENTS

| 5,091,829 | 2/1992 | Hendrischk et al. | 362/66 |
| 5,319,529 | 6/1994 | Lukkarineh et al. | 362/66 |

FOREIGN PATENT DOCUMENTS

4013893A1 10/1991 Germany .

*Primary Examiner*—Carroll B. Dority
*Attorney, Agent, or Firm*—Griffin Butler Whisenhunt & Kurtossy

[57] ABSTRACT

A reflector (3) of a motor vehicle headlight is coupled with a housing (1) by an adjustment device (4) with which it is pivoted about an axis (10). The adjustment device substantially comprises an adjusting pin (12) rotatably mounted in an opening in the housing with an end portion thereof extending outwardly from the housing opening, forming a hand knob (23) thereon for rotating the pin. An indicating device of the motor-vehicle headlight substantially comprises a toothed gear (20) with a scale-like indicator thereon and a pinion gear (16) which is formed on the hand-knob portion of the adjusting threaded pin. The toothed gear is mounted on an axle (25) extending outwardly from the housing and rotates freely in a position in which it interengages with the pinion gear. The toothed gear lies flatly on an outer surface (17) of the housing. The toothed gear has a central opening (24) and an off-center opening (27) adjacent the central opening. The openings (24, 27) are in communication with one another through a stricture (28) which is narrower than a cross section of the axle and of which, at least on one side, is radially flexible because of an adjacent cavity (30) in the toothed gear. Thus, the toothed gear can be moved between a first position in which the toothed gear interengages with the pinion and in a second position in which it is removed from this interengagement.

20 Claims, 3 Drawing Sheets

ADJUSTMENT SYSTEM FOR A MOTOR VEHICLE HEADLIGHT REFLECTOR

BACKGROUND OF THE INVENTION

This invention concerns an adjustment system, or apparatus, for a reflector of a motor-vehicle headlight of a type having: a threaded adjusting pin which is rotatably mounted in an opening of a fixed housing containing the reflector which has a hand knob on an end portion thereof for rotating it while it is coupled to the reflector at an opposite end portion thereof, so that the reflector is pivoted about an axis by rotating the adjusting pin; and an indicating device for indicating the position of the reflector comprising essentially a toothed gear with a scale-like indicator thereon and a pinion gear mounted on the adjusting threaded pin for interengaging with the toothed gear, the toothed gear being loosely mounted for rotation on an axle extending outwardly from the housing with the axle extending through a central opening of the toothed gear and having a radial lug at its free end for engaging an outwardly facing side of the toothed gear, and with the toothed gear being movable from a position in which is doesn't engage the pinion to a position in which it does engage the pinion, the toothed gear including a locking device for securing it against such movement. Such an adjusting system for a reflector of a motor vehicle headlight is disclosed in German Offerlegungsschrift DE 40 13 893 A1. In the device of this patent a housing for receiving a reflector is manufactured of resinous plastic to have a pot shape. The pot-shaped housing is closed at its front side by a light-transmissive shield or lens. The reflector is supported within the housing by two adjusting devices and a fixed holding device. With the adjusting devices the reflector can be pivoted about a horizontal axis and about a vertical axis. The horizontal axis is defined by an adjustable position of an adjusting device and a fixed position of the holding device while the vertical axis is defined by the fixed position of the holding device and an adjustable position of the other adjusting device. The adjusting device which pivots the reflector about the vertical axis has a scale-like indicating device with which, by a simple visual inspection, it can be determined if the reflector is properly adjusted with regard to its horizontal pivoting; that is, it is possible by means of a visual inspection to determine if the optical axis of the reflector extends parallel to a vertical middle plane of a motor vehicle. The adjusting pin of the adjusting device for horizontal pivoting of the reflector is rotatably mounted in an opening at an edge of a floor of the pot-shaped housing. An end portion of the adjusting pin nearest the reflector is a threaded shaft which engages a nut pivotally mounted on a backside of the reflector, the nut being slidably guided for movement on an upper sidewall of the housing. An end portion of the adjusting pin or bolt, which extends out of the housing is knurled on its outer surface. A manipulation knob is shoved onto the knurled portion in press-fit which serves as a hand knob to rotate the adjusting pin. An opening of the housing which serves as a rotational mount for the adjusting pin is sealed by a ring seal which lies against an interior edge area of the housing defining the opening. A pinion gear of the indicating device is arranged on a side of the manipulation knob facing away from the housing and has a substantially smaller cross-section than the manipulation knob. A toothed gear whose teeth interengage teeth of the pinion gear is bowl-shaped with its teeth being about its outwardly directed peripheral edge. An inner side of the bowl shaped toothed gear is directed toward a front of the headlight and on the floor of the bowl-shaped gear there is a central inverted hub in which there is a central opening of the toothed gear. The axle which extends through the central opening of the toothed gear is a separate part and its length axis extends parallel to a length axis of the adjusting pin. An end portion of the axle extending toward a front side has a knurled outer surface which is pressed into an opening in a flange of the housing extending radially from the housing. An end portion of the axle directed toward a back of the headlight has at its free end a radial head which defines a circumferential edge surrounding the axle whose outer diameter is slightly smaller than an inner diameter of the inverted hub which is in the floor of the bowl-shaped toothed gear. In a position of the toothed gear in which it interengages with the pinion gear, the circumferential edge, or head, of the axle is spaced from a base of the inverted hub and spring arms mounted outside the base of the inverted hub engage in a ring groove about the axle at a level of the manipulation knob. A scale of the indicating device is on a facing side of the toothed gear directed toward the rear of the headlight to cooperate with a pointer serving as a measuring mark, which is a separate part and which is additionally attached to the housing. In order to move the toothed gear to its position in which it is not interengaged with the pinion gear, it can be moved axially toward the rear of the headlight until the head defining the radially outwardly protruding surrounding edge of the axle engages on the base of the central depression, or inverted hub, of the toothed gear. When this is done, the spring engaging arms in the surrounding groove of the axle glide out of the ringed groove to lie on a main outer surface of the axle. By axially moving the toothed gear between these two positions the toothed gear can be set to a zero value of the scale as indicated by the pointer after the reflector of the headlight is exactly horizontally adjusted. It is a disadvantage in this known adjustment system for a reflector of a motor-vehicle headlight that the thin-wall toothed gear is spaced from a housing rear side and, when viewed along its axis, extends beyond sidewalls of the pot-shaped housing whereby the headlight can be easily and quickly damaged when it is mounted on a motor vehicle body. Further, the toothed gear must be mounted onto an axle which is a separate part. When the toothed gear is dismounted, the axle must be pulled out of the opening of the outwardly extending flange of the housing by application of great force. Pulling out the axle requires an assisting tool and the flange of the housing can be broken when it is pulled out. Similarly, when the toothed gear is mounted the axle must be pressed with great force in the opening of the flange of the housing. When this is done, one must be careful that the axle is pressed only so far into the flange of the housing that the teeth of the toothed gear come into interengagement with the pinion gear of the adjusting pin. Such a mounting and a dismounting of the toothed gear is quite inconvenient and time intensive. Further, because the toothed gear is spaced from the outer surface of the housing, it can be inadvertently moved to the position in which it is no longer in interengagement with the pinion gear. The toothed gear also cannot be moved closer to the outer surface of the housing because the large manipulation knob is arranged between it and the housing as a hand knob to rotate the adjusting pin. The pointer which provides the measuring mark is not only a separate part but also is spaced from the outer surface of the housing and can therefore be easily broken.

It is an object of the invention to provide an adjustment system of the type mentioned above for a reflector of a motor vehicle headlight whose toothed gear has an indicating device and whose axle cannot be easily damaged when it is stored, transported and mounted in a motor-vehicle-body opening and whose toothed gear can also reliably function while having a flat configuration across its width.

Further, it is an object of the invention to provide such an adjustment system whose toothed gear can be easily mounted and dismounted.

SUMMARY

According to principles of this invention:

A toothed gear having a scale-like indicator has a facing surface which is flat on an outer surface of a housing;

an off-center opening in the toothed gear adjacent a central opening is of such a size that an axle with a radial enlargement, or lug, at a free end thereof can pass therethrough;

both of the openings of the toothed gear are in communication with one another through a stricture which is narrower than a cross-section of the axle and which, on at least one side thereof, is radially flexible because of an adjacent cavity in the toothed gear; and the off-center opening of the toothed gear is arranged between the central opening and the pinion gear in both positions of the toothed gear.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
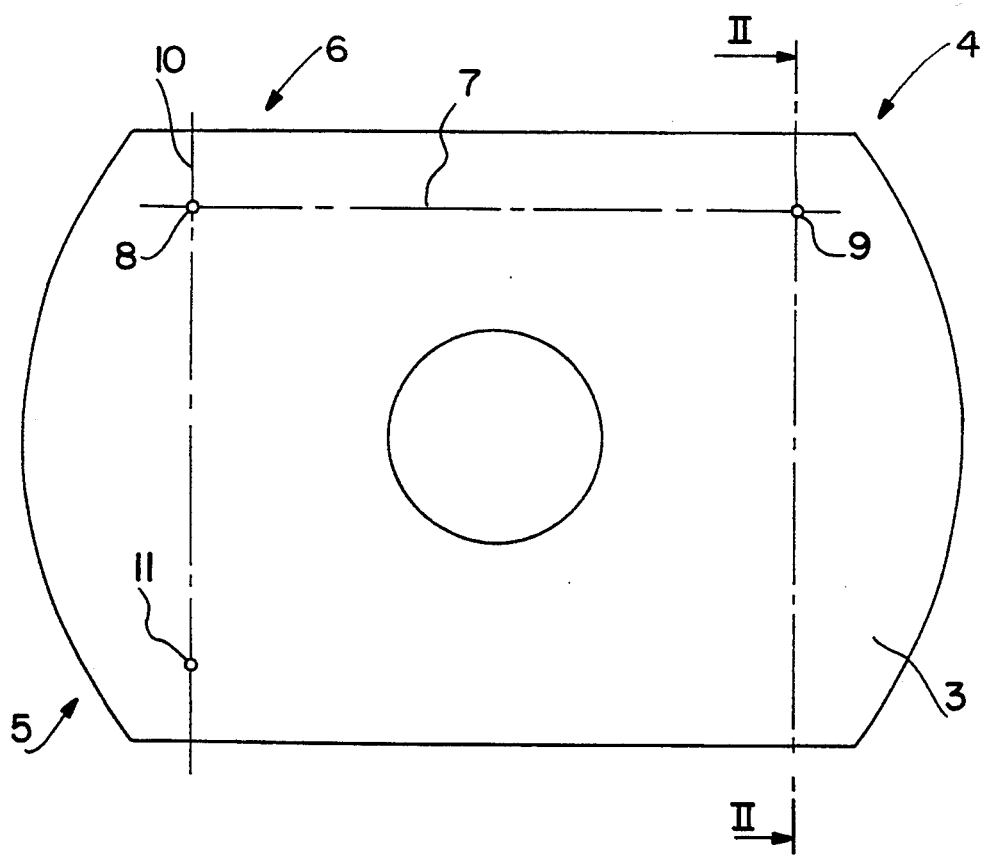
FIG. 1 is an elevational view of a reflector of a headlight.

A headlight for a motor vehicle substantially comprises a pot-shaped housing 1 constructed of resinous plastic, a light transmissive closure shield 2 whose peripheral rim is sealing connected to a peripheral rim of the housing, and a reflector 3 mounted in an interior of the headlight defined by the housing 1 and the light transmissive shield 2; with the reflector being coupled to the housing 1 by two adjustment devices 4 and 5 and a fixed holding device 6. The reflector 3 is pivoted about a horizontal axis 7, which extends through a fixed pivot point 8 and an adjustable pivot point 9 of the adjustment device 4, by the adjustment device 5 and the reflector 3 is pivoted about the vertical pivot axis 10, which extends through the fixed pivot point 8 of the holding device 6 and an adjustable pivot point 11 of the adjustment device 5, by the adjustment device 4. Thus, the horizontal pivot axis 7 and the vertical pivot axis 10 intersect at the fixed pivot point 8 of the holding device 6.

Figure 2:
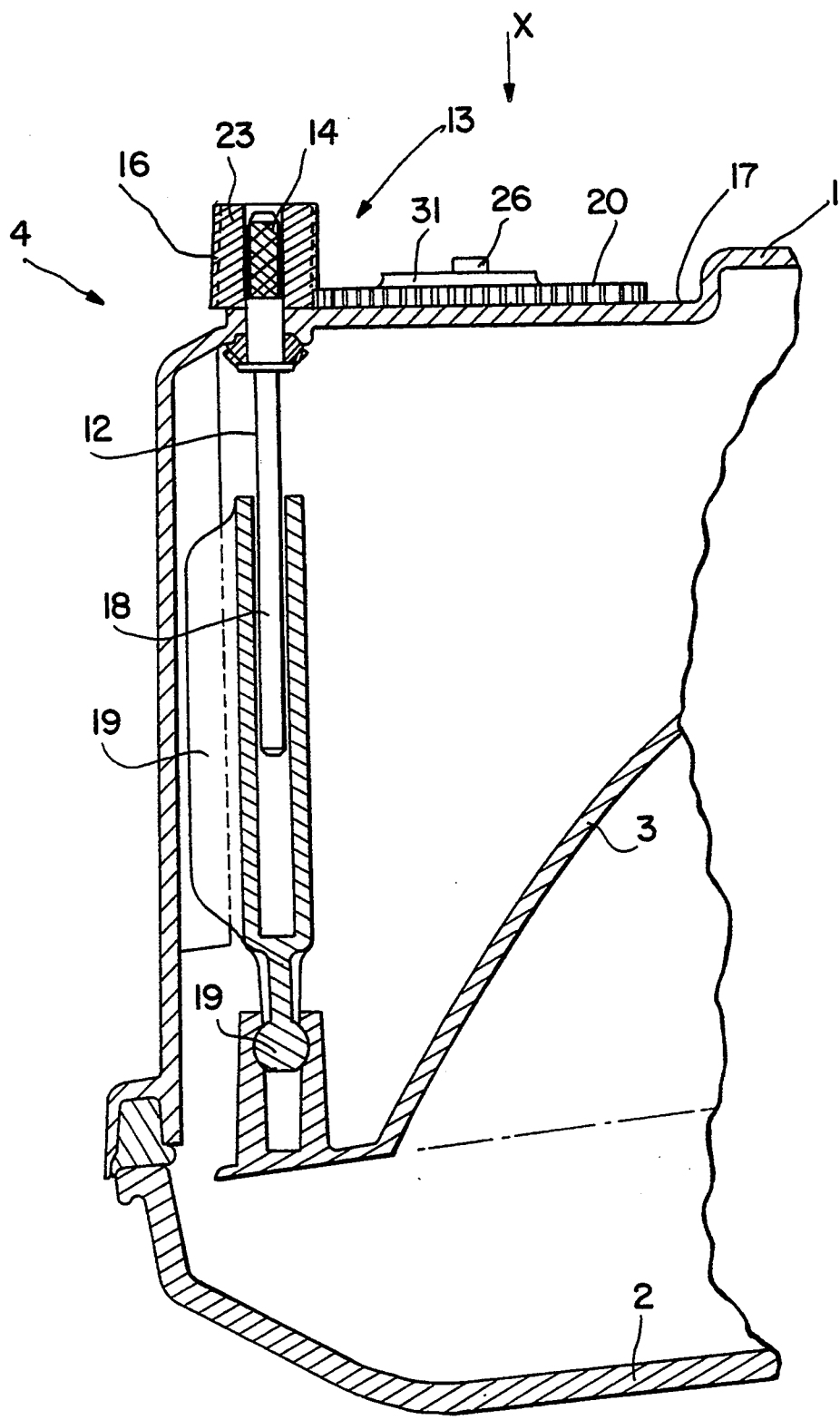
FIG. 2 is a segmental cross-sectional view through a headlight taken on line II—II in FIG. 1, showing an adjustment system of this invention.

The adjustment device 4 is shown in FIG. 2 to generally comprise an adjusting pin 12 for coupling the reflector 3 to the housing 1 and an indicating device mounted on an exterior surface of the housing 1. The adjusting pin 12 is constructed of metal and is rotatably mounted in an opening in a floor, or rear wall, of the pot-shaped housing 1. The adjusting pin 12 is mounted from the interior of the pot-shaped housing so that an end portion 14, having a knurled outer surface, extends through an opening in the housing 1 until a ring seal 15 on a surrounding flange of the adjusting pin 12 sealingly engages an interior surface of the housing. A pinion gear 16 is on the knurled portion 14 which extends from the opening of the housing 1, the pinion gear being in the form of a cylindrical wheel which is press-fitted on the knurled portion until a facing side thereof lies against a planar receiving surface 17 on the exterior of the housing. An end portion 18 of the adjusting pin, extending in a light beam direction into the interior of the headlight, has a male thread thereon which interengages with a nut 19 which is slidably guided on an interior surface of an upper sidewall of the pot-shaped housing 1. The nut 19 has a spherical head which is self-guidingly mounted in a linkage socket on a rear side of the reflector. This ball head and the linkage socket form an adjustable, or movable, pivot point 9 of the adjustment device 4.

Figure 3:
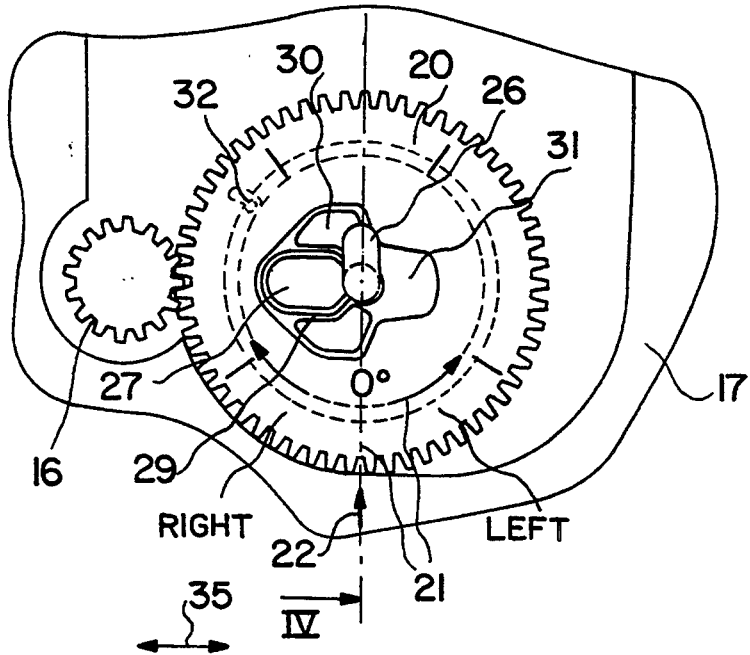
FIG. 3 is a segmental view taken from direction X in FIG. 2 of an indicating device of the adjusting system for a reflector depicted in FIG. 2.
Figure 4:
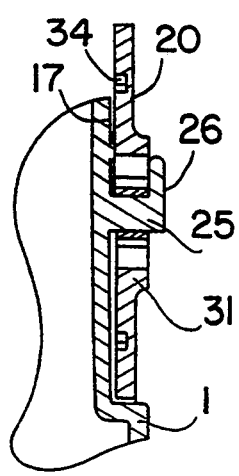
FIG. 4 is a sectional view taken on line IV—IV in FIG. 3.

The indicating device 13 which is mounted on an exterior surface of the housing 1 comprises the pinion gear 16, a toothed gear 20 whose teeth are interengaged with those of the pinion gear, a scale-like indicator which includes a scale 21 on an outer facing side of the toothed wheel 20 and a measuring mark 22 on the housing which is a raised arrow formed on an outer surface of the housing 1. Further, two opposite circumferentially directed arrows having "right" and "left" labels are on a facing side of the toothed gear 20. In FIG. 3 the toothed gear 20 is shown in interengagement with the pinion gear 16. The toothed gear 20 is constructed to be flat in its breadth and to have a facing surface lying flat on the planar receiving surface 17, as is the pinion gear 16. The pinion gear 16 is constructed to be many times higher, or thicker, than the thickness of the toothed gear 20. An end portion 23 of the pinion gear 16 extending away from the housing 1 serves as a knob to rotate the adjusting pin 12. Thus, no special adjusting knob is necessary for the knob 23 for rotating the adjusting pin. The toothed gear 20 is mounted on an axle 25 formed on the planar receiving surface 17 of the housing 1, with its central opening 24 receiving the axle, so as to be as play-free as possible and to freely rotate when the pinion gear 16 is rotated. When the reflector 3 is exactly adjusted horizontally by the adjustment device 4 a 0° mark on the scale 21 is exactly aligned with the pointer, or measuring mark, 22. If the scale-like indicator indicates a value displaced from the 0° mark, the labels "left" and "right" are indicated showing towards which side the reflector is horizontally adjusted from a desired position.

The axle 25 has at its free end a barb-like lug 26 directed toward the rear side of the housing which overlaps with an edge defining the central opening 24. The toothed gear is held to be as play free as possible between this barb-like lug 26 and the receiving surface 17 of the housing 1.

In a position of the toothed gear 20 in which the toothed gear is interengaged with the pinion 16 and the reflector is adjusted so that the pointer, or measuring mark, 22 is on the 0° mark of the scale 21, an off-center opening 27 is in the toothed gear between the axle 25 and the pinion 26, radially adjacent the central opening 24. The off-center opening 27 has a shape such that the free end portion of the axle 25 having the barb-like lug 26 thereon can pass therethrough in the axial direction. The central opening and the off-center opening 27 are coupled to one another, or communicate with one another, by a stricture 28 which extends between them. The edges of both openings 24 and 27 leading into the stricture 28 are spring-like in an outward, radial, direction because they are formed of thin walls 29 which extend between each of the openings 24 and 27 and adjacent cavities 30 in the toothed gear. Both of the cavities 30 and both openings 24 and 27 are in an outwardly protruding hub-like raised area 31 of the toothed gear 20. The hub 31 serves as a hand grip for shoving the toothed gear radially from the position of the toothed gear 20 shown in FIG. 3 to the position of the toothed gear in FIG. 6, in which it is not interengaged with the pinion gear. The toothed gear 20 is held adjusted in the latter position by a ball-like protrusion 32 on the planar receiving surface 17 of the housing 1 protruding into an elongated slot 33 extending in a shoving direction 35 of the toothed gear 20 which is in a bottom facing side of the toothed gear 20. The protrusion 32 is arranged between the axle 25 and the pinion gear 26 and is spaced from a line connecting them. The elongated groove extends, in a direction away from the pinion gear 16, to a ring grove 34 in a bottom facing side of the toothed gear 20. In the position of the toothed gear 20 shown in FIG. 6, in which the toothed gear is not interengaged with the pinion gear, the ball-shaped protrusion 32 is in the end of the elongated groove 33, spaced furtherest from the ring groove 34, and the toothed gear 20 is positioned with edge portions defining the openings 24 and 27 in the area of the stricture 28 at the outer surface of the axle 25. By this means the toothed gear is held against rotation in its adjusted position. After the reflector is adjusted, the toothed gear 20 is shoved against the pinion gear until the axle, because of radial flexing of the thin walls in the area of the stricture 28, extends through the central opening 24 of the toothed gear. In this manner, it is guaranteed that after a new adjustment of the reflector the scale-like indicating device 13 displays a 0° value.

Figure 5:
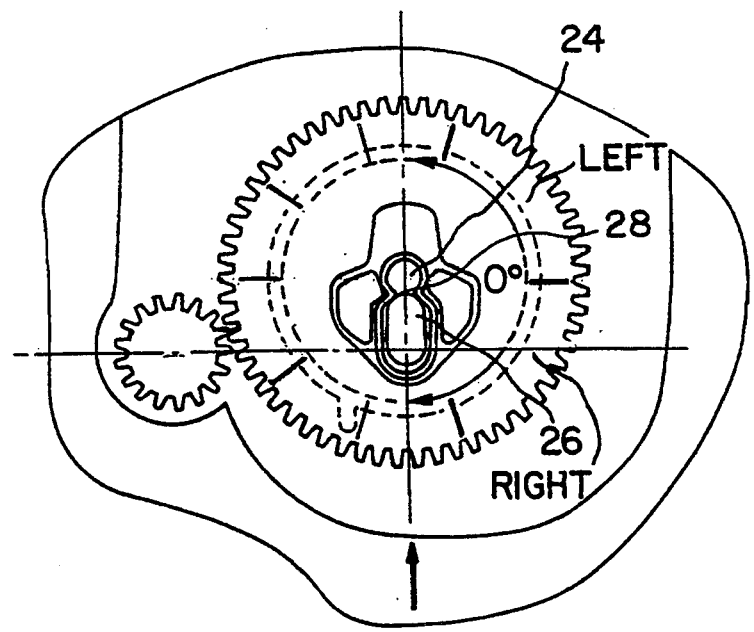
FIG. 5 is a view similar to that of FIG. 3, however, with a different setting of a toothed gear of the indicating device; and, FIG. 6 is a view similar to that of FIG. 3, however, with a different setting of a toothed gear of the indicating device.
Figure 6:
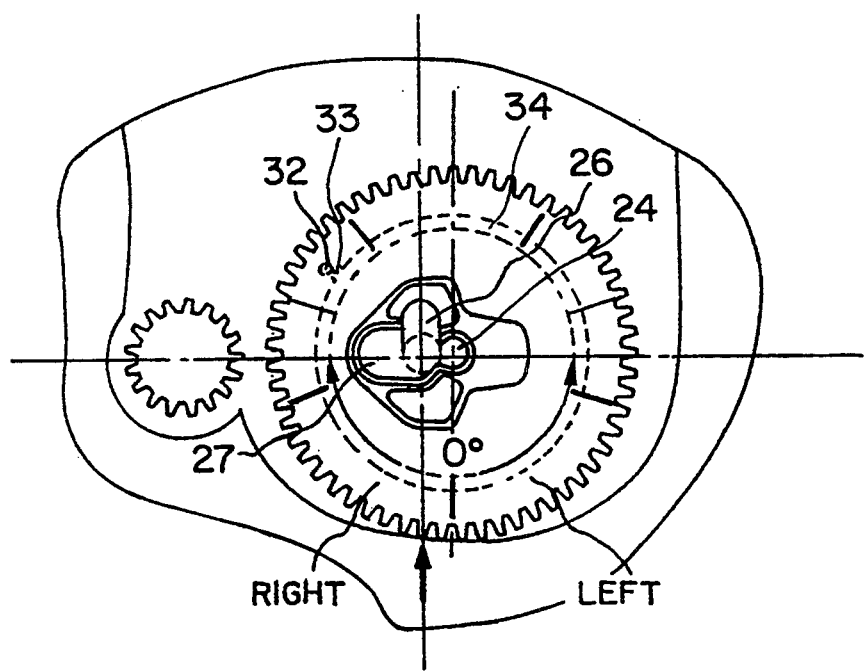

When the toothed gear 20 is dismantled, it is rotated ¼ turn from the FIG. 6 position to the FIG. 5 position. Thereafter, the toothed gear can be pulled axially from the axle 25. When the toothed gear is mounted, the above-described steps are carried out in reverse order.

The mounting and dismounting of the toothed gear can be easily accomplished by hand without the necessity of auxiliary tools. Upon mounting the toothed gear it is placed, with its off-center opening, on the axle having the radial lug until it lies flat on the outer surface of the housing. Thereafter, the toothed gear, when its off-center opening is arranged between the central opening and the pinion, is shoved toward the pinion gear until, because of radial spring flexing of the edges forming the stricture, the axle extends through the central opening of the toothed gear. Once the stricture has radially, flexibly, "returned", the toothed gear is held against radial movement. A holding against axial movement of the toothed gear is accomplished by the radial lug on the axle which overlaps and engages an exterior facing surface of the toothed gear and the receiving surface for the toothed gear formed on the exterior of the housing. In order to move the toothed gear to a position in which it is not interengaged with the pinion gear, the toothed gear, when its off-center opening is arranged between the axle and the pinion gear, is shoved away from the pinion gear until the axle extends through the off-center opening of the toothed gear under a radial spring flexing of the stricture. In this position of the toothed gear, that is when the axle extends through the off-center opening of the toothed gear, the toothed gear can be simply and easily pulled from the axle because the radial lug of the axle fits through the off-center opening of the tooted gear. Because the toothed gear can be formed to have a thin wall because of its flat engagement with the housing, it occupies very little space and can thereby be used in most headlights.

Further, it is beneficial for the stricture to be formed by thin walls extending between the cavities and both openings of the toothed gear. The thinner the walls forming the stricture the greater is the radial elasticity of the spring path.

It is further beneficial for the axle to be formed on (as one piece with) an exterior surface of a housing formed of resinous plastic. Such a structure is uncomplicated and can be economically manufactured. Further, the axle is not so easily broken during mounting of the headlight even though it is constructed of the resinous plastic of the housing since, because of the flat structure of the toothed gear it has a low profile.

It is a further benefit for the toothed gear to be held as axially play-free as possible between the radial lug of the axle and the outer surface of the housing. In this manner the toothed gear is held rattle-free and in this manner a proper functioning of the indicating device is assured.

It is yet further beneficial that the radial lug at the free end of the axle is similar to the form of a lug end portion of a key with the lug facing rearwardly. With such a structure, the barb-like, or lobe like, lug of the axle can be molded with mold halves which are used to form the exterior of the vehicle.

Further, it is useful that the barb-like or lobe like lug extends perpendicular to the shoving direction of the toothed gear. Because of this the toothed gear, when it is shoved to its release position, can only then be pulled from the axle if the off-center opening and the barb-like lug are directly aligned. In order to achieve this, the toothed gear is rotated after it is shoved to the release position.

Similarly, it is beneficial that the toothed gear has a hub which defines both openings and which protrudes axially outwardly from an outer facing surface of the toothed gear. Because of this, the thin walls forming the stricture between both openings and the cavities can be thicker and because of a then greater radial spring force of the walls the position of the toothed gear is reliably held in which the axle extends through the central opening.

In addition, it is beneficial that the pinion gear has a flat surface which lies flat on an outer surface of the housing and that the receiving surface of the housing for the pinion gear and the toothed gear extends in a plane. In this regard, it is helpful that the pinion gear has a greater thickness than the toothed gear by whole number multiples and that its end portion facing away from the housing forms a hand knob for rotating the adjusting pin. In this manner, proper functioning of the toothed-gear linkage is assured and the pinion gear itself can serve as a hand knob for rotating the adjusting pin.

Further, it is beneficial if adjacent to the toothed gear the measuring mark for the scale-like indicator is placed on the outer surface of the housing by adhering a film to the outer surface of the housing or by forming it directly on the housing. Such a measuring mark does not protrude far from the housing and therefore cannot be easily damaged.

Still further, it is beneficial if the effective tooth depth between the toothed gear and the pinion gear is smaller than half the diameter of the central opening of the toothed gear. In this manner it is assured that the teeth of the pinion and the toothed gear also can come into engagement with one another when their outer surfaces contact one another upon the toothed gear being shoved toward the pinion gear because then in this position of the toothed gear its stricture somewhat grips the axle and thereby upon a rotation of the adjusting pin the toothed gear automatically moves itself toward the pinion gear.

In a particularly beneficial further embodiment of the invention the toothed gear, in a position in which it is not interengaged with the pinion gear, is held on the housing to prevent its rotation by a locking device having the function of maintaining a pre-adjustment of the scale-like indicator of the toothed gear. In this manner, the reflector of the headlight, after it is mounted in a vehicle body cavity, can be adjusted without the toothed gear having the indicator thereof being rotated. Only after the reflector is horizontally adjusted, is the toothed gear pushed out of its pre-adjustment position toward the pinion gear. When this is done, it is helpful that the toothed gear in the pre-adjustment position, for example with a particular value such as a zero value, is arranged such that it, after the toothed gear is shoved to the pinion gear, lies opposite to the measuring mark on the housing.

It is further beneficial for the locking device to comprise a protrusion that is formed on the toothed gear or the housing which respectively engages in a recess of the toothed gear or the housing. Such a structure can be easily and cost-effectively manufactured. A particularly uncomplicated solution is provided by having the protrusion formed on the exterior of the housing at the side of the toothed gear facing away from the pinion gear to engage in one or more tooth spaces of the toothed gear.

Further, it is beneficial for the protrusion of the locking device to be rounded and engage only slightly into a recess form as a depression. In this manner it is practical for the recess to be formed as an elongated groove which extends in a shoving direction into a ring grove which is concentric with a rotational axis of the toothed gear and which has a diameter such that the protrusion engages in the ring groove when the toothed gear is in a position for interengaging with the pinion gear, with the protrusion being at the end of the elongated groove, spaced from the ring groove, when the toothed gear is in the out-of-engagement position. In this regard, it is further beneficial that, when the toothed gear is in the out-of-engagement-position, the axle, which extends through the off-center opening, lies at the stricture extending between the two openings. With such a structure the toothed gear is reliably radially locked in its preadjustment position as well as in its position in which it engages the pinion gear.

The embodiments of the invention in which an exclusive property or privilege are claimed are defined as follows:

1. An adjustment system for a reflector of a motor vehicle headlight having an adjusting pin which is rotatably mounted in an opening of a fixed housing which contains the reflector and having a hand knob for rotating it at one end portion thereof and being coupled to the reflector at the other end portion thereof, said reflector being pivotable about an axis in response to the shaft being rotated and said adjustment system having an indicating device for indicating a position of the reflector, said indicating device substantially comprising a toothed gear with a scale-like indicator thereon and a pinion gear mounted on the adjusting pin for interengaging with the toothed gear, said toothed gear being freely mounted for rotation on an axle extending outwardly from the housing, said axle extending through a central opening of the toothed gear and having a radial lug at its free end for engaging an outwardly-facing side of the toothed gear, said toothed gear being movable from a position in which it does not engage the pinion to a position in which it does engage the pinion, said toothed gear including locking means for securing it against said movement; wherein the toothed gear having the scale-like indicator has a facing side which lies flat on an outer surface of the housing;

the toothed gear has an off-center hole therethrough spaced laterally from the central hole which is so large that the axle with its radial lug can pass therethrough;

both openings of the toothed gear are in communication with one another through a stricture which is narrower than a cross section of the axle and at least on one side thereof an edge defining said stricture is radially flexible because of an adjacent cavity in the toothed gear; and in both positions of the toothed gear the off-center hole of the toothed gear is normally arranged approximately between the central opening and the pinion.

2. An adjustment system as in claim 1 wherein the stricture is formed by a thin wall of the toothed gear extending between the adjacent cavity and both the central hole and the off-center hole.

3. An adjustment system as in claim 1 wherein the housing is formed of resinous plastic and the axle is formed as one piece with the housing on an outer surface thereof.

4. An adjustment system as in claim 1 wherein the toothed gear is held substantially play-free between the radial lug of the axle and an outer surface of the housing.

5. An adjustment system as in claim 1 wherein the radial lug is at an outer free end of the axle and has a shape which is similar to a lug end portion of a key.

6. An adjustment system as in claim 5 wherein the lug is at an end portion of the axle directed toward the rear side of the headlight.

7. An adjustment system as in claim 5 wherein the lug normally is positioned to extend perpendicular to a shoving direction of the toothed gear.

8. An adjustment system as in claim 1 wherein the toothed gear has a hub which defines the central and off-center openings and which has a surface axially raised from an exterior facing side of the toothed gear.

9. An adjustment system as in claim 1 wherein the pinion gear has a facing side lying flat on an exterior surface of the housing and a receiving surface of the housing for the pinion gear and the toothed gear lies substantially in one plane.

10. An adjustment system as in claim 1 wherein the pinion gear is a whole number multiple thicker than the toothed gear and a portion thereof facing away from the housing serves as a hand grip to rotate the adjusting pin.

11. An adjustment system as in claim i wherein a measuring mark of a scale-like indicator is placed on an outer surface of the housing adjacent the toothed gear which is formed of a film adhered to the outer surface of the housing or which is formed as part of the housing.

12. An adjustment system as in claim 1 wherein an effective tooth depth of teeth of the toothed gear and the pinion gear is smaller than half the diameter of the central opening of the toothed gear.

13. An adjustment system as in claim 1 and further including a locking means on the housing for locking the toothed gear against rotation when it is moved to a non-engaging position with the pinion gear to thereby maintain a previous adjustment reading for the scale-like indicator of the toothed gear.

14. An adjustment system as in claim 13 wherein the locking means comprises a protrusion formed on one of the toothed gear and the housing which respectively engages in a recess in the other of the toothed gear and the housing.

15. An adjustment system as in claim 14 wherein the protrusion is on the exterior of the housing at the edge of the toothed gear facing away from the pinion gear and engages in one or more tooth spaces of the toothed gear.

16. An adjustment system as in claim 14 wherein the locking means comprises a first element positioned on an inner facing side of the tooth gear intermediate peripheral edge portions thereof, and a second element on the exterior of the housing opposite the first element.

17. An adjustment system as in claim 16 wherein the protrusion of the locking device is rounded and engages only slightly in the recess formed as a depression.

18. An adjustment system as in claim 17 wherein the recess is formed as an elongated groove extending in a shoving direction of the toothed gear and which extends into a ring groove which is concentric with an axis of rotation of the toothed gear and which has a diameter such that the protrusion engages therewith when the toothed gear is in a position for its teeth to be interengaging with those of the pinion gear.

19. An adjustment system as in claim 18 wherein the protrusion engages in an end of the elongated groove furtherest from the ring groove when the toothed gear is in a non-interengaging position.

20. An adjustment system as in claim 1 wherein the axle which extends through the off-center opening when the toothed gear is in the non-interengaging position lies at the stricture which extends between the off-center opening and the central opening.

* * * * *